United States Patent Office 3,189,934
Patented June 22, 1965

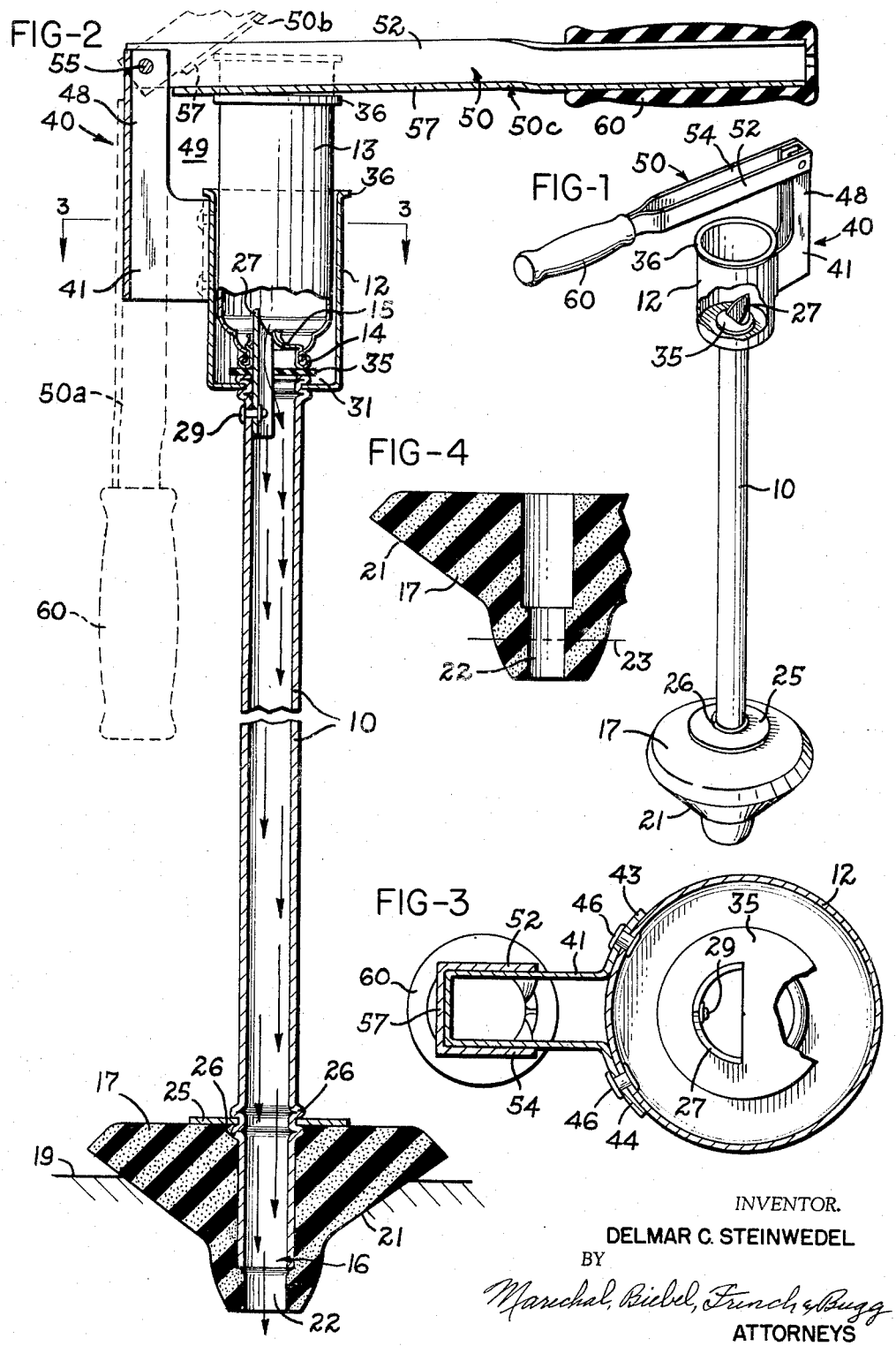

3,189,934
PLUMBING TOOL
Delmar C. Steinwedel, Seymour, Ind., assignor to Seymour Tool & Engineering Co., Inc., Seymour, Ind., a corporation of Indiana
Filed Feb. 7, 1963, Ser. No. 256,993
4 Claims. (Cl. 15—406)

The present invention relates generally to a plumbing tool, and more particularly to a plumber's helper which utilizes compressed gas to effect unblocking of drains, pipes and the like.

The primary object of this invention is to provide a plumber's helper of relatively simple construction which is adapted to discharge compressed gas whereby the gas passes through the pipes to free the pipes of obstructions therein.

Another object of the present invention is to provide a plumber's helper of the type above described including an operating assembly mounted on an elongated rigid tubular gas conducting frame to which is attached a compressible sealing member for effecting a seal between a sink drain or toilet bowl opening and the like, and wherein the operating handle is spaced from the sealing member a distance sufficient to allow free and unobstructed movement thereof during use of the plumber's helper.

Another object of the present invention is to provide a plumber's helper of the type above described which is so constructed that the operator may position the seal member thereof in sealing relationship with the opening of a sink drain or toilet bowl with one hand and effect release of gas from a pressurized gas container with the other hand and wherein during the gas releasing operation the force required to puncture the can assists in maintaining the plumber's helper in sealing relationship to the opening.

A further object of the present invention is to provide a plumber's helper wherein the structure of the operating handle assembly is designed to provide a maximum mechanical advantage thereby facilitating release of a compressed gas for freeing and unblocking clogged pipes and like.

Other objects and advantages of the invention will be apparent from the following description, the accompanying drawing and the appended claims.

In the drawing:

FIG. 1 is a view in perspective, with portions thereof broken away, of the plumber's helper constructed in accordance with the present invention.

FIG. 2 is a view partly in section and partly in elevation showing the various positions of the operating handle and the seal provided during use of the plumber's helper in accordance with the present invention;

FIG. 3 is a section along the lines 3—3 of FIG. 2 showing the plumber's helper with the operating handle in its rest position; and FIG. 4 is a fragmentary section through the seal member prior to assembly.

Referring to the drawing, which illustrates a preferred embodiment of the present invention, the plumber's helper includes an elongated rigid tubular, and preferably cylindrical gas conducting frame 10 of substantial length having affixed at one end thereof a chamber 12 adapted to receive a container 13 of pressurized gas such as Freon or carbon dioxide or other suitable gaseous materials. The frame 10 and chamber 12 may be of any suitable metal or strong plastic. Although the exact structure of the container is not material to the present invention, it preferably contains an annular lip 14 against which a gas-tight seal may be formed, and a rupturable gasket 15.

The tubular member 10 includes discharge means 16 at one end thereof over which is carried an easily deformable resilient sealing member 17 proportioned to form a seal between the discharge means 16 and a pipe opening or toilet bowl schematically indicated at 19. The seal member 17 is preferably a molded sponge-like or compressible material such as rubber, polyurethane foam or the like, and includes an inwardly sloped lower surface 21 which is smaller in diameter than the upper portion of the seal. Preferably, the bottom end of the seal extends beyond the end of tube 10 to prevent contact between the tube and the sink, although the tube does extend a substantial distance into the seal.

As shown in FIG. 4, the member 17 is molded to have a central opening of reduced diameter in the lower portion thereof, as indicated at 22. When the lower end of the tube 10 is inserted to the line 23, the portion 22 of reduced diameter forms a gas-tight seal with the tube. Other seal elements may be utilized provided they are proportioned to provide a seal between the opening in the sink or drain and the discharge means. A disk element 25 is secured to the conduit or tubular member 10 by annular lips 26 which are formed by hot upsetting, and the disk forms a shoulder for urging the resilient sealing member 17 into sealing engagement with the conduit or toilet bowl as a force is applied to the plumber's helper in a generally axial direction. The disk 25 may also be spot welded or secured to the tubular member by any other suitable means.

Supported by and mounted within the tubular member is a container puncturing element 27 in the form of a hollow bayonet fitting, the cutting edge of which projects into the chamber means 12. The puncturing element 27 is preferably secured to the tubular element 10 by a rivet 29.

Surrounding the puncturing element and seated in the base 31, which forms the gas tight connection between the chamber and the tube is a seal element 35 which operates to provide a gas tight seal between the container at the lip 14 whereby the gas which is released from the container may flow through the puncturing element into the tubular element 10 as indicated by the arrows of FIG. 2. To facilitate placing a can or other container in the chamber, a lip 36 is provided around the open end of the chamber and forms a guideway.

A bracket assembly 40 including a bracket member 41 having flared skirts 43 and 44 is mounted on chamber 12 by rivets 46, the portions thereof extending into the chamber and being flattened to conform to the contour of the chamber as shown in FIG. 3, and it is understood that the bracket may be affixed to the chamber by spot welding or the like. The bracket is preferably channel-shaped in section and extends radially outward from the chamber. Integral with the bracket 41 is an extension 48 which is spaced radially from the chamber to provide a space 49 therebetween, and which rises vertically above the lip 36 a distance sufficient to allow a container of pressurized gas to be inserted into the chamber. Hinged to the extension 48 is an operating handle 50 which is also channel-shaped in section and proportioned to interfit over the extension and bracket when in the rest position 50a in which the handle is in spaced parallel relationship to the tube 10. The operating handle is provided with spaced tabs 52 and 54 which are secured by a pivot pin 55 to the extension.

The handle is movable from the rest position to a ready position 50b transversely of the axis of the chamber 12 so that the flat face 57 thereof engages the bottom of the container 13 between the pivot point of the handle and a point midway along the length thereof. Since the bracket extends radially outwardly from the chamber, the pivot point is axially spaced from the chamber and cooperates with the handle which is proportioned in length to provide a mechanical advantage thereby enabling puncturing of the container with a smooth downward stroke of the handle. As the handle rotates downwardly to a lowered position 50c, the container 13 is forced into rupturing engagement with the knife 27, and the protruding end of the knife 27 and the movement of the handle are correlated so that in the lowered position the handle is substantially normal to the axis of the base 31. If desired, a friction grip 60 may be inserted on the end of the operating handle 50.

In operation, the handle 50 is moved to the rest position 50a and a container 13 of pressurized gas is inserted into the chamber. The seal 17 is placed over the drain opening or the like and a vertically downward force may be applied by grasping the tube with one hand and pushing down. The downward force operates to compress the porous, relatively high density sponge-like seal element between the drain opening and the lower end of the tube 10 to prevent passage of gas therebetween. The handle is then moved to the ready position 50b, and during this time the seal between the seal member 17 and the opening 19 may be maintained by exerting a downward force parallel to the axis of the tube with the palm of the hand positioned over the bracket assembly. If this is not possible due to tight working conditions, the fingers may be inserted into space 49 between the extension 48 and the container 13 to urge the plumber's helper downwardly. When it is positioned in sealing engagment with the seal element, the handle may be moved to its lower position 50c with a smooth stroke which operates to puncture the container 13. The vertical component generated by the downward movement of the handle applies a downward force to maintain the seal between the compressible element 17 and the drain opening 19 with disk 25 operating to prevent the seal from moving up the tube 10.

The movement of the operating handle 50 from the ready position to the lower position punctures the container, and compressed gas flows from the ruptured container through the opening in the knife assembly and into the hollow tube and through the drain pipe to effect unblocking thereof. Seal element 35 operates to prevent leakage of the compressed gas around the knife assembly during the rupturing operation.

Since the gas is expanding rapidly, perhaps in the order of 250 to 300 times its original volume, some cooling results in the area of the knife assembly and that portion of the tube secured to the base of the chamber 12. Since the vertically downward force component resulting from movement of the operating handle from the ready to the lower position also maintains element 17 in sealing relationship with the opening 19, both hands may be removed from the tube 10 or the area of the junction between the tube and the lower end of the chamber. For example, once positioned over the opening, and with the handle in the ready position, both hands may be removed from the cooled area by placing the palm of one hand over the pivot point and grasping the friction grip with the other as described above.

The height of the container 13 and the pivot position of the handle 50 on the assembly 40 is proportioned so that the lower surface of the handle contacts the bottom of the container 13 only along the edge nearest the pivot pin 55, as clearly shown in the dotted and full line positions of FIG. 2. This condition of contact between the handle and the edge of the container 13 nearest the pivot point is maintained throughout the movement of the handle thereby maintaining full advantage of the length of the handle. The arrangement of the parts is therefore such that the container is ruptured in a uniform motion of the handle from the dotted position to the full line position shown in FIG. 2 with the lever action remaining substantially constant throughout the stroke since the region of contact with the handle and the container remain substantially constant and does not transfer to the opposite side of the container in the fully seated position of the container shown. It has been found that this arrangement results in rupturing the gasket 15 and getting the container 13 against the seal 35 quickly with a minimum loss of gas.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for unblocking pipes and the like comprising
   a rigid tubular gas conducting frame having means at one end thereof for receiving a flat bottomed container of pressurized gas of a length greater than said container receiving means to extend thereabove and discharge means at the other end thereof,
   said discharge means including resilient sealing means for engaging a drain opening and the like in sealing relationship,
   said container receiving means being in fixed relation to said resilient sealing means,
   container puncturing means projecting into said container receiving means,
   means positioned within said container receiving means for providing a seal between said puncturing means and a container,
   said puncturing means being mounted to provide passage of gas from a punctured container into said frame,
   an operating handle assembly including a bracket and an operating handle,
   said bracket being mounted on said container receiving means and including an extension laterally offset from said container receiving means, said extension terminating beyond the open end of said container receiving means to provide mounting means for an operating handle, operating handle means pivotally mounted on said extension and movable from one position to a rupturing position for puncturing a container and maintaining it in sealed relationship with said seal means within said container means, the spacing of said handle means on said extension with respect to said container receiving means being proportioned to provide engagement of said handle means with the edge of such container in said container receiving means nearest said bracket and to maintain said engagement throughout the rupturing movement thereof providing substantially constant leverage on such container during rupturing and sealing thereof,
   and said operating handle means being of sufficient length to provide a mechanical advantage for relatively easy puncturing of a container positioned within said container receiving means.

2. Apparatus for unblocking pipes and the like comprising a rigid tubular gas conducting frame having means at one end thereof for receiving a flat bottomed container of pressurized gas of a length greater than said container receiving means to extend thereabove and discharge means at the other end thereof,
   said discharge means including resilient sealing means for engaging a drain opening and the like in sealing relationship,
   said container receiving means being in fixed relation to said resilient sealing means,
   container puncturing means mounted on said frame and including a cutting surface projecting into said container receiving means,
   means positioned within said container receiving means for providing a seal between said puncturing means and a container, said puncturing means being mounted to provide passage of gas from a punctured container into said frame, an operating handle assembly including a bracket and an operating handle, said bracket being mounted on said container receiving means, said bracket including a channel-shaped extension laterally offset from said container receiving means and terminating beyond the open end of said container receiving means, a generally channel-shaped operating handle proportioned to interfit over said extension and pivotally mounted for movement thereon between a folded position in which said handle opens inwardly toward said extension in interfitting relation thereto to a container rupturing position, the spacing of said handle on said extension with respect to said container receiving means being proportioned to provide engagement of said handle with the edge of such container in said container receiving means nearest said bracket and to maintain said engagement throughout the rupturing movement thereof providing substantially constant leverage on such container during rupturing and sealing thereof, and said operating handle being proportioned in length for cooperation with the axially spaced pivot to provide a mechanical advantage for relatively easy puncturing of a container positioned within said container receiving means.

3. Apparatus for unblocking pipes and the like comprising a rigid elongated gas conducting frame having means at one end thereof for receiving a flat bottomed container of pressurized gas of a length greater than said container receiving means to extend thereabove and discharge means at the other end thereof, said discharge means including resilient sealing means for engaging a drain opening and the like in sealing relationship, said container receiving means being in fixed relation to said resilient sealing means, container puncturing means mounted on said frame and projecting into said container receiving means, means positioned within said container receiving means for providing a seal between said puncturing means and a container, said puncturing means being mounted to provide passage of gas from a punctured container into said frame, an operating handle assembly including bracket means and an operating handle, said bracket means being mounted on said container receiving means and including an extension laterally offset from said chamber, said extension terminating beyond the open end of said chamber, operating handle means pivotally mounted on said extension for movement from a first position in parallel spaced relationship with said frame to a rupturing position transverse the axis of said chamber, and the downward component of force exerted on said handle means during movement to the rupturing position being operative to puncture a container while maintaining said resilient means in sealing relationship with a drain opening, the spacing of said handle means on said extension with respect to said container receiving means being proportioned to provide engagement of said handle means with the edge of such container in said container receiving means nearest said bracket and to maintain said engagement throughout the rupturing movement thereof providing substantially constant leverage on such container during rupturing and sealing thereof, and said operating handle means being of sufficient length to provide mechanical advantage for puncturing a container positioned within said container receiving means.

4. Apparatus for unblocking pipes and the like comprising a rigid tubular gas conducting frame having chamber means at one end thereof for receiving a flat bottomed container of pressurized gas of a length greater than said container receiving means to extend thereabove and discharge means at the other end thereof, said discharge means including resilient porous sealing means for engaging a drain opening and the like in gas sealing relationship, said container receiving means being in fixed relation to said resilient sealing means, container puncturing means mounted on said frame and extending into said chamber means, means positioned within said chamber means for providing a seal between said puncturing means and a container, said puncturing means being mounted to provide passage of gas from a punctured container through said frame, an operating handle assembly including a bracket and an operating handle, said bracket being channel-shaped in section and mounted on said chamber means, said bracket including an integral channel-shaped extension spaced axially from said chamber means and terminating beyond the opened end of said chamber means, a generally channel-shaped operating handle proportioned to interfit over said extension and pivotally mounted for movement thereon between folded position in which said handle opens inwardly toward said extension in interfittting relation thereto to a container rupturing position, the spacing of said handle on said extension with respect to said container receiving means being proportioned to provide engagement of said handle with the edge of such container in said container receiving means nearest said bracket and to maintain said engagement throughout the rupturing movement thereof providing substantially constant leverage on such container during rupturing and sealing thereof, the downward component of force exerted on said handle during movement to the rupturing position being operative to puncture a container while maintaining said resilient means in sealing relationship with a drain opening, and said operating handle being proportioned in length for cooperation with the axially spaced pivot to provide a mechanical advantage for relatively easy puncturing of a container positioned within said chamber means.

References Cited by the Examiner
UNITED STATES PATENTS

| | | | |
|---|---|---|---|
| 948,590 | 2/10 | Lundgren | 4—255 |
| 1,772,674 | 8/30 | Markus. | |
| 2,999,264 | 9/61 | Stearns | 15—406 |
| 3,051,356 | 8/62 | Kirby | 222—5 |

WALTER A. SCHEEL, Primary Examiner.